United States Patent [19]
Kanevsky et al.

[11] Patent Number: 5,953,700
[45] Date of Patent: Sep. 14, 1999

[54] PORTABLE ACOUSTIC INTERFACE FOR REMOTE ACCESS TO AUTOMATIC SPEECH/SPEAKER RECOGNITION SERVER

[75] Inventors: Dimitri Kanevsky, Ossining, N.Y.; Stephane Herman Maes, Danbury, Conn.; Peter S. Poon, Somers; Carl Prochilo, Woodstock, both of N.Y.

[73] Assignee: International Business Machines Corporation, Armonk, N.Y.

[21] Appl. No.: 08/873,079

[22] Filed: Jun. 11, 1997

[51] Int. Cl.[6] ........................................ G10L 5/06
[52] U.S. Cl. ............................ 704/246; 704/273
[58] Field of Search ..................... 704/200, 246–250, 704/270, 273, 275, 231, 251

[56] References Cited

U.S. PATENT DOCUMENTS

| | | | |
|---|---|---|---|
| 3,896,266 | 7/1975 | Waterbury | 235/380 |
| 4,130,731 | 12/1978 | Bolgiano et al. | 455/403 |
| 4,811,399 | 3/1989 | Landell et al. | 704/253 |
| 4,827,518 | 5/1989 | Feustel et al. | 704/246 |
| 4,847,885 | 7/1989 | Vittorelli | 379/6 |
| 5,166,971 | 11/1992 | Vollert | 379/88.02 |
| 5,293,424 | 3/1994 | Holtey et al. | 380/23 |
| 5,371,901 | 12/1994 | Reed et al. | 455/69 |
| 5,414,755 | 5/1995 | Bahler et al. | 379/88.02 |
| 5,680,506 | 10/1997 | Kroon et al. | 704/203 |
| 5,714,741 | 2/1998 | Pieterse et al. | 235/380 |
| 5,809,464 | 9/1998 | Kopp et al. | 704/235 |

OTHER PUBLICATIONS

Lawrence E. Rabiner and Ronald W. Schafer, Digital Processing of Speech Signals, Prentice Hall, Upper Saddle River, NJ, 1978.

*Primary Examiner*—David R. Hudspeth
*Assistant Examiner*—Donald L. Storm

[57] ABSTRACT

A portable acoustic signal (speech signal) preprocessing (SSP) device for accessing an automatic speech/speaker recognition (ASSR) server comprises a microphone for converting sound including speech, silence and background noise signals to analog signals; an analog signals to digital converter for converting the analog signals to digital signals; a digital signal processor (DSP) for generating feature vector data representing the digitized speech and silence/background noise, and for generating channel characterization signals; and an acoustic coupler for converting the feature vector data and the characterization signals to acoustic signals and coupling the acoustic signals to a communication channel to access the ASSR server to perform speech and speaker recognition at a remote location. The SSP device may also be configured to compress and encrypt data transmitted to the ASSR server via the DSP and encryption keys stored in a memory. The ASSR server receives the preprocessed acoustic signals to perform speech/speaker recognition by setting references, selecting appropriate decoding models and algorithms to decode the acoustic signals by modeling the channel transfer function from the channel characterization signals and processing the silence/background noise data to reduce word error rate for speech recognition and to perform accurate speaker recognition. A client/server system having the portable SSP device and the ASSR server can be used to remotely activate, reset, or change personal identification numbers (PINs) or user passwords for smartcards, magnetic cards, or electronic money cards.

23 Claims, 4 Drawing Sheets

FIG. 4

PORTABLE ACOUSTIC INTERFACE FOR REMOTE ACCESS TO AUTOMATIC SPEECH/SPEAKER RECOGNITION SERVER

RELATED APPLICATION DATA

This application is related to U.S. application Ser. No. 08/871,784, filed Jun. 11, 1997 entitled "Apparatus and Methods for Speaker Verification/Identification/Classification Employing Non-Acoustic and/or Acoustic Models and Databases", which is commonly assigned and is filed concurrently with the present application.

BACKGROUND OF THE INVENTION

1. Technical Field

The present invention relates to automatic speech/speaker recognition (ASSR), and more particularly to an ASSR technique using a portable acoustic coupler or interface for remotely accessing an ASSR server over a communication channel such as a telephone line.

2. Discussion of Related Prior Art

In typical client/server or subscriber/service provider systems in which resources in the central server or service provider are accessed by numerous clients or subscribers, some form of client/subscriber authentication technique is used to verify that the client/subscriber is a valid system user. In many such systems, the authentication code, such as a PIN (personal identification number), keyword, or password is communicated by keying in a code or communicating in text to an operator. In some systems, the authentication code is by voice, i.e., the code is spoken into the server. The server (in this case, an ASSR server) recognizes the speech utterance and compares it against stored valid voice authentication codes to authenticate that the user is a valid client.

In ASSR server/client systems, it would be convenient if a client is able to remotely communicate his authentication code by voice over a communication channel such as a telephone line, making possible the capability for any client to have access to the server wherever a telephone line is available. The telephone line may be a land line or cellular line. In the cellular case, access to the server is completely portable, i.e., whenever and wherever a cellular phone and a cellular connection are available.

Operational difficulties associated with telephonic ASSR systems such as one described above include (1) loss of accuracy due to degradation of voice data when it is sent over telephone lines, and (2) the varied background noise characteristics at the user end depending upon the location of the telephone from which the user is calling, such as when a caller is calling from a street phone or when he is driving a car, etc. Both situations result in either data or signal integrity loss and thus severe reduction in the accuracy in recognition of the speech/speaker.

This loss of data and recognition accuracy problem can be reduced or eliminated if speech signal preprocessing (SSP) is performed at the client's end prior to the signal being sent over the telephone line to the server. SSP includes characterizing the acoustic features of the transmitting device, environment, speaker, and the communication channel. The SSP information is processed by the ASSR server to set references, select appropriate decode models and algorithms to recognize the speaker or decode the speech by modeling the channel transfer function and the background noise to reduce word error rate of the speech or to accurately perform speaker recognition. However, to perform SSP at the user's end, one would need SSP equipment including a computer having SSP software. Such SSP capability is generally absent in present standard telephones or network computers (NC).

Therefore, there is a need for a portable SSP device which is compact in size and light in weight for ease of transport, capable of coupling onto any telephone or a data communication device and includes capabilities for facilitating accurate speaker recognition when accessing the ASSR server over the communication channel and throughout the interaction with the server, and for accurate speech recognition communication between the portable SSP device and the ASSR server.

SUMMARY OF THE INVENTION

The illustrative embodiment of the present invention includes a portable SSP device, comprising a microphone for converting sound including speech, silence and background noise signals to analog signals; an analog to digital converter for converting the analog signals to digital signals; a digital signal processor (DSP) for generating from the digital signals feature vector data representing the speech and characterization data representing the silence and background noise signals; a coupler for coupling to an acoustic or data communication device for communicating the signals representing the feature vector data over a communication channel for recognition of the speech by an ASSR server at a remote location. The coupler is preferably an acoustic coupler which converts the feature vector data to acoustic signals and in such case, the communication channel is also acoustic, like a telephone line. Alternately, the coupler includes appropriate interface, e.g., connector, ports and protocols, for coupling to a digital transmission device for transmission over a data communication channel.

The portable SSP device preferably includes an encryption device for encrypting the feature vector data, and a data compression device for compressing the feature vector data. The portable SSP device preferably includes means for receiving and processing return signals from the ASSR server and means for converting the return signals to digital return data for processing by the DSP. In such preferred embodiment, the DSP further includes means for decompressing the digital return data and means for decrypting the digital return data.

The portable SSP device further preferably includes means for facilitating estimation of the transfer function of the communication channel, including acoustic characteristics associated with the speaker, silence and background noise; preferably, by sending a set of estimation reference signals (or "characterization signal") to the ASSR server connected to the channel at the remote location. The portable SSP device includes memory for storing data, including encryption key data or authentication data unique to that device.

Another illustrative embodiment of the present invention includes an ASSR system having a portable SSP device having a digital signal processor (DSP) for processing digitized speech spoken into a microphone and generating feature vector data representing the speech; and a coupler for coupling to a communication device connected to a communication channel such as a telephone line or a digital network connection and for converting the feature vector data to signals for communicating over the communication channel; and an automatic speech/speaker recognition (ASSR) server connected to the communication channel for receiving the signals transmitted from the portable SSP via the communication channel and processing the received signals for recognition of the speech.

The ASSR server in the system includes stored models of enrollment or authentication data. The models are built during subscriber or client enrollment. The ASSR server also stores a set of vocabularies and other models, such as language models and Hidden Markov Models (HMM), for speech recognition. The ASSR server processes the signals received from the portable SSP device and compares the processed signals with the stored models.

Advantageously, with remote speaker authentication capability, the system according to the illustrative embodiment of the present invention provides capabilities for remote smartcard or magnetic card activation/deactivation or password or PIN code change and reactivation.

Further, the remote speech recognition system according to the illustrative embodiment of the present invention provides ASSR capabilities with low error large vocabulary speech recognition, even in adverse signaling or highly distorted communication environments.

BRIEF DESCRIPTION OF THE DRAWINGS

Preferred embodiments of the invention are described below in detail by reference to their accompanying drawings, of which.

DETAILED DESCRIPTION OF PREFERRED EMBODIMENTS

Figure 1:
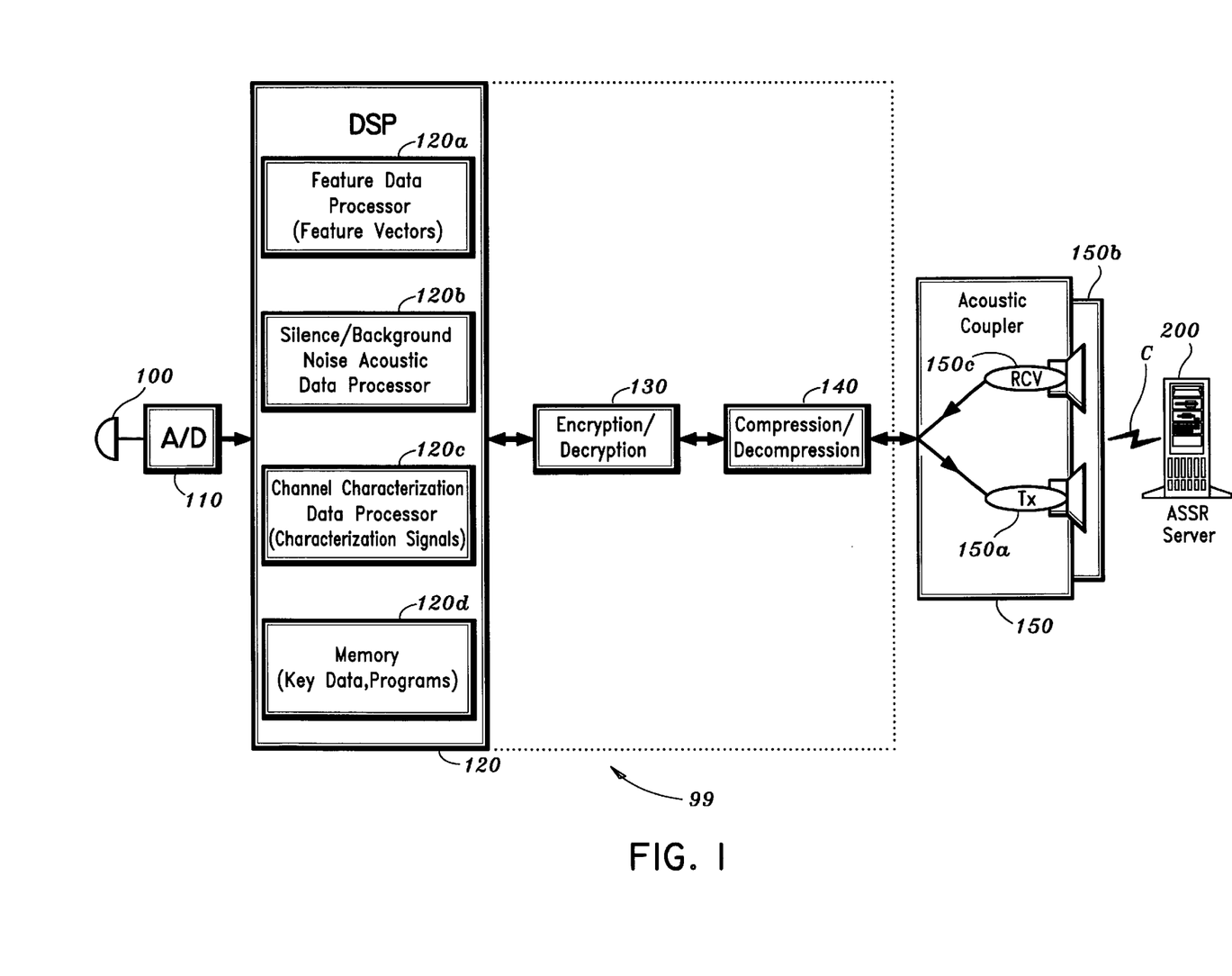
FIG. 1 illustrates a portable acoustic signal preprocessing device according to a preferred embodiment of the present invention.

FIG. 1 shows a block diagram of the portable speech (or acoustic) signal preprocessing (SSP) device 99 according to an illustrative embodiment of the present invention. Microphone 100 is used to receive sound including speech spoken by the user, silence and background noise and convert the sound into analog electrical signals. The microphone 100 is connected to analog to digital converter 110 which converts the analog electrical signal from the microphone 100 to digitized signals for forwarding to digital signal processor (DSP) 120 for processing. DSP 120 preferably includes a processor and associated memory and stored programs 120d for processing data and for controlling data flow in the portable SSP device 99. In the present embodiment, the functions of DSP 120 include preprocessing the speech data spoken into microphone 100 into feature vectors (or "feature data") via feature data processor 120a, process silence and background noise data via silence/background noise acoustic data processor 120b to assist in establishing or estimating the transfer function of the communication channel via channel characterization data processor 120c, and perform other ASSR functions including coordination of transmission and reception of data to and from the portable SSP device, encrypt/decrypt, and compress/decompress data if necessary. These functions and the estimation of transfer function of communication channel will be further described below. It is noted that all the above-described DSP functions or techniques are known to one ordinarily skilled in the art and numerous DSPs commercially available can be used to perform such functions. For example, model TMS 32010, made by Texas Instruments, Inc. or UPD 7720, made by Nippon Electric Co., are DSPs suitable for the described applications.

Data processed by DSP 120 is output to acoustic coupler 150, wherein the digital data are converted to audio signals. As such, the audio signals from the acoustic coupler could be played or spoken into an audio communication device such as a standard telephone handset for transmission over an audio communication channel C such as a telephone line. According to the present preferred embodiment, acoustic coupler 150 includes a transmitter 150a (e.g., a transducer) which converts the digital signals to audio signals and a coupler 150b suitable for coupling with the receiver or mouthpiece of a standard telephone handset. For example, the coupling portion 150b of the acoustic coupler 150 is preferably made with a flexible material, such as rubber, which allows it to be mated or coupled firmly onto the mouthpiece of standard telephone configurations so that the portable SSP device 99 could be easily attached or removed from any standard telephone set, facilitating portability and easy transport of the portable device from telephone to telephone, wherever the user may be. The portable device is preferably self-powered with a battery. As can be visualized, the basic components of the portable device, which includes the microphone, A to D converter, DSP, coupler and battery, is compact in size and light in weight. The portable device may be handheld or a user can wear it in a shirt pocket much like a pocket calculator or wallet.

Again referring to FIG. 1, encryption/decryption device 130 and compression/decompression device 140 are optional components of portable ASSR device 99. The encryption/decryption device 130, which may be a separate chip or module connected to DSP 120 or may be an integral program of DSP 120, encrypts the data preprocessed by DSP 120 with a preestablished encryption key to provide secure transaction of the signals over the telephone line. The encryption key (i.e., key data stored in memory 120d) may be a user dependent key code.

Preferably, DSP 120 adds a known signal to the stream of feature vectors for processing by ASSR server 200. If this signal is known and expected by ASSR server 200, extraneous signals can be easily extracted and reversal of the process from server to client is made simpler. In radio communications, for example, a spread spectrum modulation of the signal may be employed. A number of other known encryption techniques or algorithms can be used for the encryption/decryption process. See, for example, the encryption algorithms described in 'Applied Cryptography', by Bruce Schenier, second edition, Wiley, 1996.

Compression/Decompression device 140 is optional and may be a component or chip disposed external to DSP 120 or may be incorporated as a stored program function of DSP 120. Compression/Decompression device 140 compresses the preprocessed data, whether encrypted or unencrypted, prior to transmission over the telephone line to increase the amount of data carried by the audio signals transmitted given the low bandwidth of the telephone line. Signal compression techniques are also well known. The compression/decompression device 140 preferably compresses losslessly.

Preprocessing of the digitized data from microphone 100 includes the known techniques of generating sequences of feature vectors (via the feature data processor 120*a*) representing the speech pattern spoken into microphone 100. For example, U.S. Pat. No. 5,544,277 describes one such preprocessing technique. The disclosure of U.S. Pat. No. 5,544,277 is incorporated by reference herein. Additionally, DSP 120 processes the silence and background noise data (via the acoustic data 120*b*) to create ambient data and forward such data over the telephone line to an ASSR server 200 for processing. The ASSR server 200 is preferably located in a centralized location and is connected to the telephone line or a digital network for easy access from any telephone or networked station.

According to another preferred embodiment of the present invention, DSP 120 coordinates the reception of the audio data by the portable SSP device 99 from the ASSR server 200 over the communication line C. Audio data from the ASSR server 200 includes prompts asking further information or instructions to the user. In such illustrative embodiment, acoustic coupler 150 includes a receiver 150*c* which is configured and sized much like the transmitter 150*a* of the acoustic coupler 150 for mating with the earpiece of the telephone handset via coupler 150*b*. Another loudspeaker may be coupled to the earpiece or to the coupler 150*b* to announce the received message. DSP 120 includes optional stored program functions capable of decompressing the received data and decrypting the received data, if encrypted and compressed data was sent from the ASSR server 200. Alternatively, decompression and decryption may be performed via the compression/decompression device 140 and the encryption/decryption device 130, respectively. The receiver portion 150*c* of acoustic coupler 150 converts the audio signals received from the earpiece of the handset to digital signals for processing by DSP 120.

Figure 2:
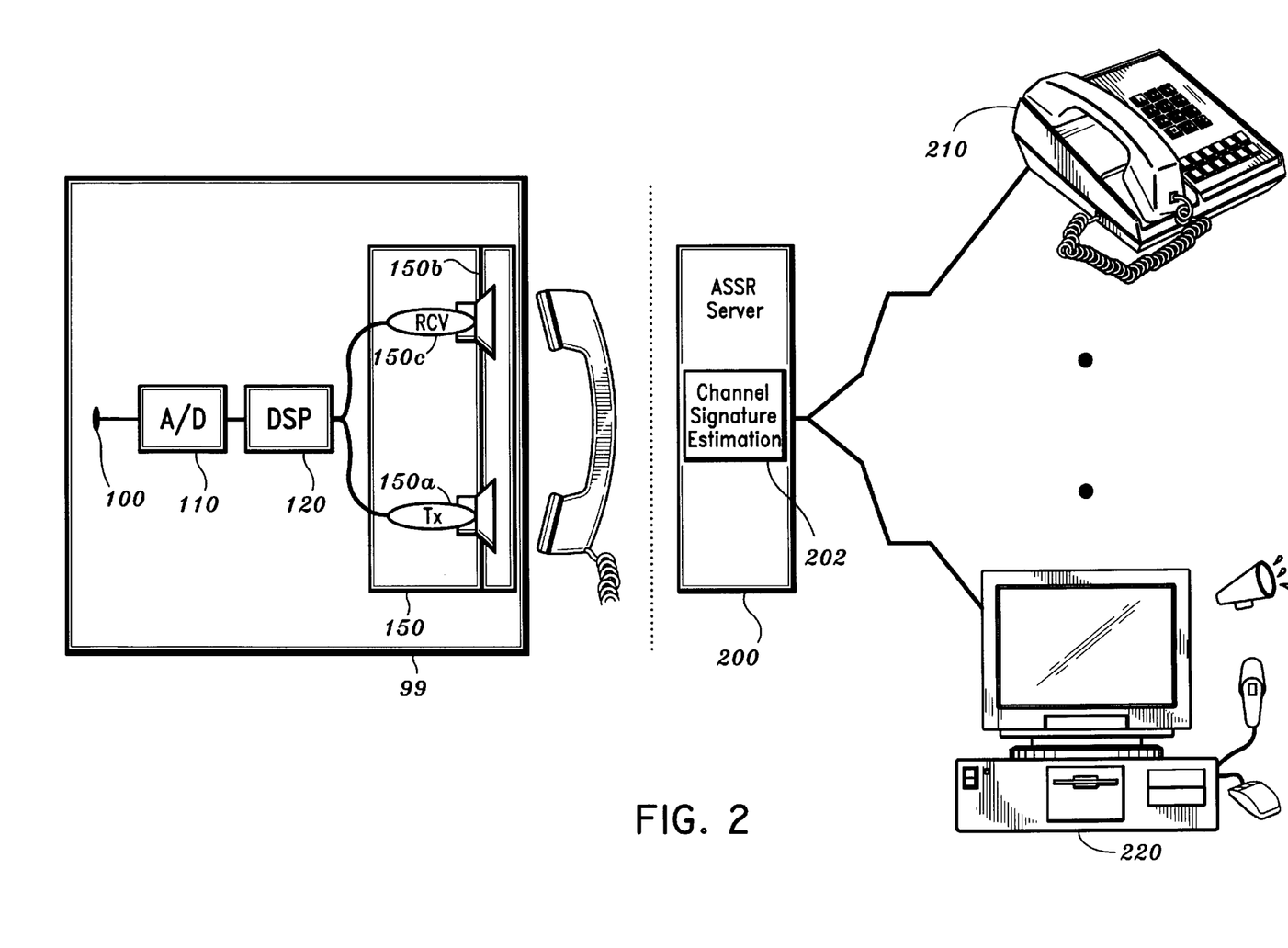
FIG. 2 is a block diagram of a system having the device of FIG. 1 according to another illustrative embodiment of the present invention.

A system utilizing the portable SSP device 99 of the present invention is illustrated in FIG. 2. ASSR server 200 is preferably located at a centralized location remote from the portable SSP device 99 and is accessible from a telephone over the telephone line. Once a connection is established, connecting ASSR server 200 with the portable SSP device 99, an automatic speech/speaker recognition (ASSR) system is established. ASSR server 200 communicates with the portable SSP device 99 to establish or estimate the transfer function of the communication channel by reading silence and background noise present at the user's end. Estimation techniques of the transfer function of a communication channel are well known. See, for example, "Automatic Control Systems" by B. C. Kuo, Prentice Hall, 1987, and "Signal Processing, the Modern Approach," by J. V. Candy, McGraw Hill, 1988. An illustrative process according to the present invention is described below. DSP 120 (via the channel characterization data processor 120*b*) generates different signals (i.e., characterization signals) at the beginning of the transmission or connection. The different signals are ascending and descending chirp of known characteristics, a series of equally spaced sign tones and a white noise signal. The order duration and spacing between the signals are well established. The signals are generated as soon as an input tone is received by the portable device 99 from the ASSR server 200. They are generated twice. Once from DSP 120 and once by microphone 100. The acoustic signal received by ASSR server 200 is compared to preestablished reference signals and the transfer function of the channel and background are inferred, creating a signature of the channel (via channel signature estimation module 202). This signature is used to deconvolve the speech feature vectors. The ASSR server 200 preferably includes ASSR store programs for speech or speaker recognition. For example, Hidden Markov Models (HMM) representing lefemes (i.e., portions of phonemes in a given left and right context) are used by describing the probability of observing the observed acoustic features if they are in the corresponding states and recognizing the speech utterance as the optimal path (i.e., the sequence of lefemes which leads to the highest likelihood computed based on the HMM probabilities and language modeling probabilities). The probabilities may be trained by aligning the HMM with transcribed training speech and updating accordingly the probabilities. For example, U.S. Pat. Nos. 5,031,217 and 5,276,766 describe speech recognition techniques using KMM and other models. The disclosures of these patents are incorporated by reference herein.

The ASSR system according to the illustrative embodiment of the present invention characterizes the silence and background noise at the user end (via acoustic data processor 120*b* shown in FIG. 1). It preferably listens to the background noise at the beginning of the connection, during user silence or during the emission of reference signals from DSP 120 as previously described. The background noise is detected by microphone 100, processed by DSP 120 and sent after the second portion of reference signals. ASSR server 200 uses this information to infer the background noise and modifies accordingly the processing of the received input vectors (e.g., by cepstral mean subtraction, deconvolution, etc.) (via module 202). Alternatively, stored models for speech or speaker recognition trained for such conditions may be used. Similarly, silence periods are detected and acoustic features associated with the silence in between words and before the user speaks are preferably used to estimate the background noise.

Advantageously, the ASSR system of the illustrative embodiment of the invention performs speaker and speech recognition. Speaker recognition can be used to remotely access an ASSR server. Preferably, the illustrative ASSR system of the present invention substantially continually process communicated data as a background task to verify the presence of the speaker throughout a session.

Figure 3:
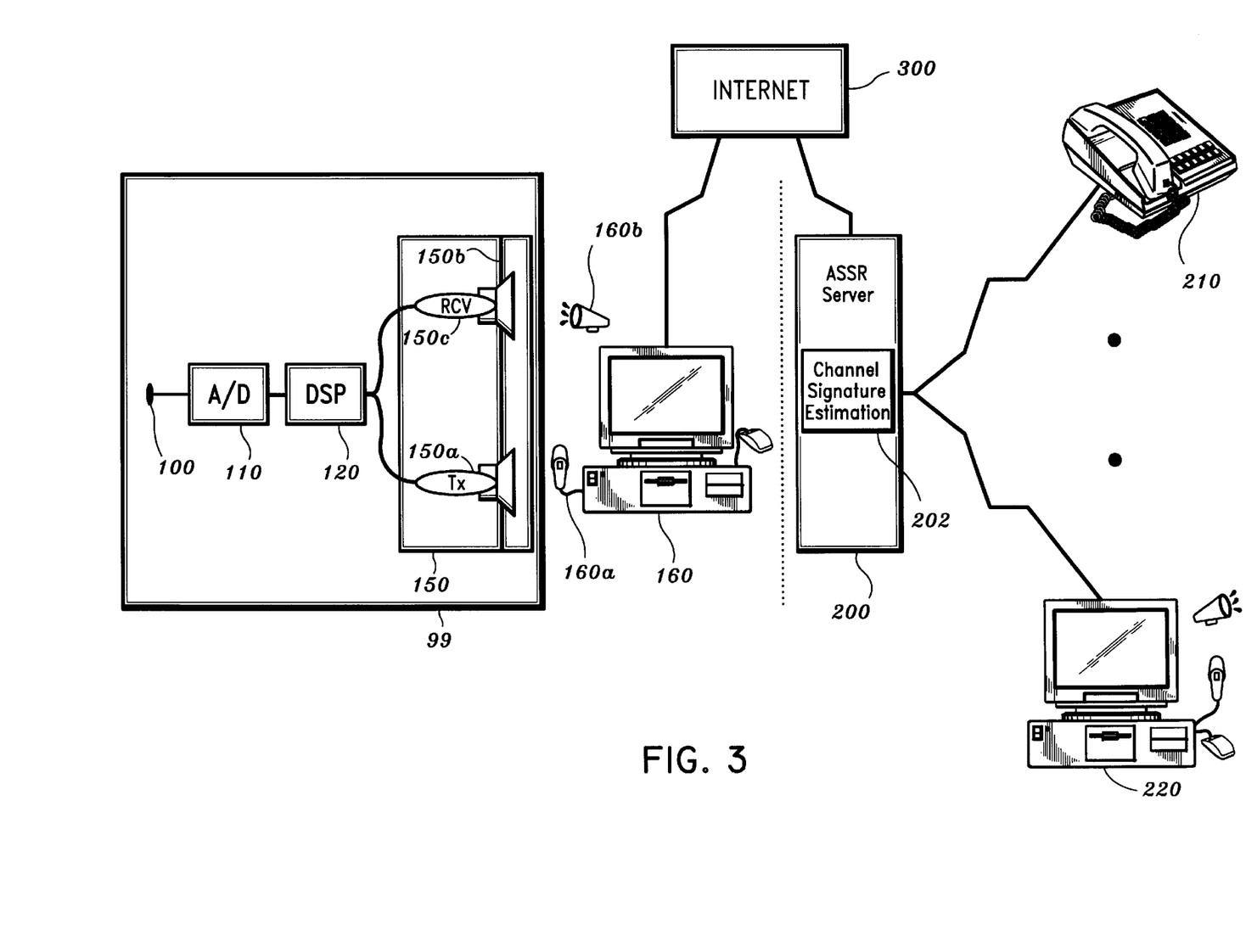
FIG. 3 is a block diagram of another system having the portable device of FIG. 1 according to the illustrative embodiment of the present invention.

The ASSR system according to the invention have heretofore been illustrated with a communication device being a telephone, the communication channel being a telephone line and the ASSR server 200 being connected to the telephone line. It is also within the contemplation of the present invention that the communication channel is a digital communication channel such as internet, intranet, or local area network. ASSR server 200 may thus be accessible by telephone or by digital network. FIG. 3 illustrates the use of the portable device 99 with a multimedia personal computer 160 for interfacing with ASSR server 200. In this embodiment, the handset is replaced by multimedia computer 160, which includes a microphone 160*a* and a loudspeaker 160*b*. The receiver portion 150*c* of acoustic coupler 150 is disposed proximal to the loudspeaker 160*b* of the computer 160 and the transmitter portion 150*a* of acoustic coupler 150 is disposed proximal to the microphone 160*a* of the computer. The computer 160 includes a modem for transmitting data over a telephone line 160*a* or may connect to ASSR server 200 through an internet server 300. If internet server 300 includes ASSR capabilities as in ASSR server 200, an ASSR system or connection can be established between computer 160 and internet server 300. In this embodiment, the multimedia computer 160 acts as the audio communication device.

Alternatively, the portable SSP device 99 may be connected to the computer 160 via a connector to one or more I/O ports of the computer 160. In such embodiment the acoustic coupler 150 may be dispensed with, since data from DSP 120 can be sent directly to the processor of the computer 160. According to a further alternative embodiment of the present invention, the multimedia computer 160 may be a portable laptop multimedia computer having built-in the components of the above-described portable SSP device 99. Hence, the portable multimedia laptop computer is capable of performing all functions performed by the portable SSP device 99. The portable laptop can connect directly to ASSR server 200 through a modem or through the internet server 300, e.g., by protocols such as TCP/IP, NEt BUI, etc.

According to a still further alternative embodiment of the present invention, the functions and components of portable SSP device 99 may be built-in a cellular phone. Thus, the SSP cellular phone includes DSP 120 and the connection with and access to ASSR server 200 is by cellular communication channel, which may be analog or digital (e.g., CDMA, GSM, etc.).

Advantageously, with the previously described capability in the portable device 99 to receive, decrypt, or decompress data from ASSR server 200, various data can be received for performing decryption or authentication functions. For example: encryption keys are received to encrypt the received signal during the present and the next communications; cookies are received to determine how long is the key valid, how long are PIN numbers of the key card valid, etc.; digital certificates or certificates of authenticity received previously and used to authenticate the user until they expire; noise pattern received for noise masking or unmasking; and PIN numbers or codes for smartcards, which are part of what is encoded with the embedded chip of a smartcard or on the magnetic band of a credit card type card, along with a cookie which characterizes the expiration date of the PIN. The received data can be stored in the memory of DSP 120. An interface which couples to the portable device 99 may be used to read/write/reprogram the DSP 120 by known techniques.

Accordingly, the illustrative device and technique of the present invention can be used for authenticating, resetting or revoking subscriber or client passwords, logons, PINs, and/ or encryption/decryption keys. Such tasks can be remotely performed on a smartcard or a card having a magnetic band.

Figure 4:
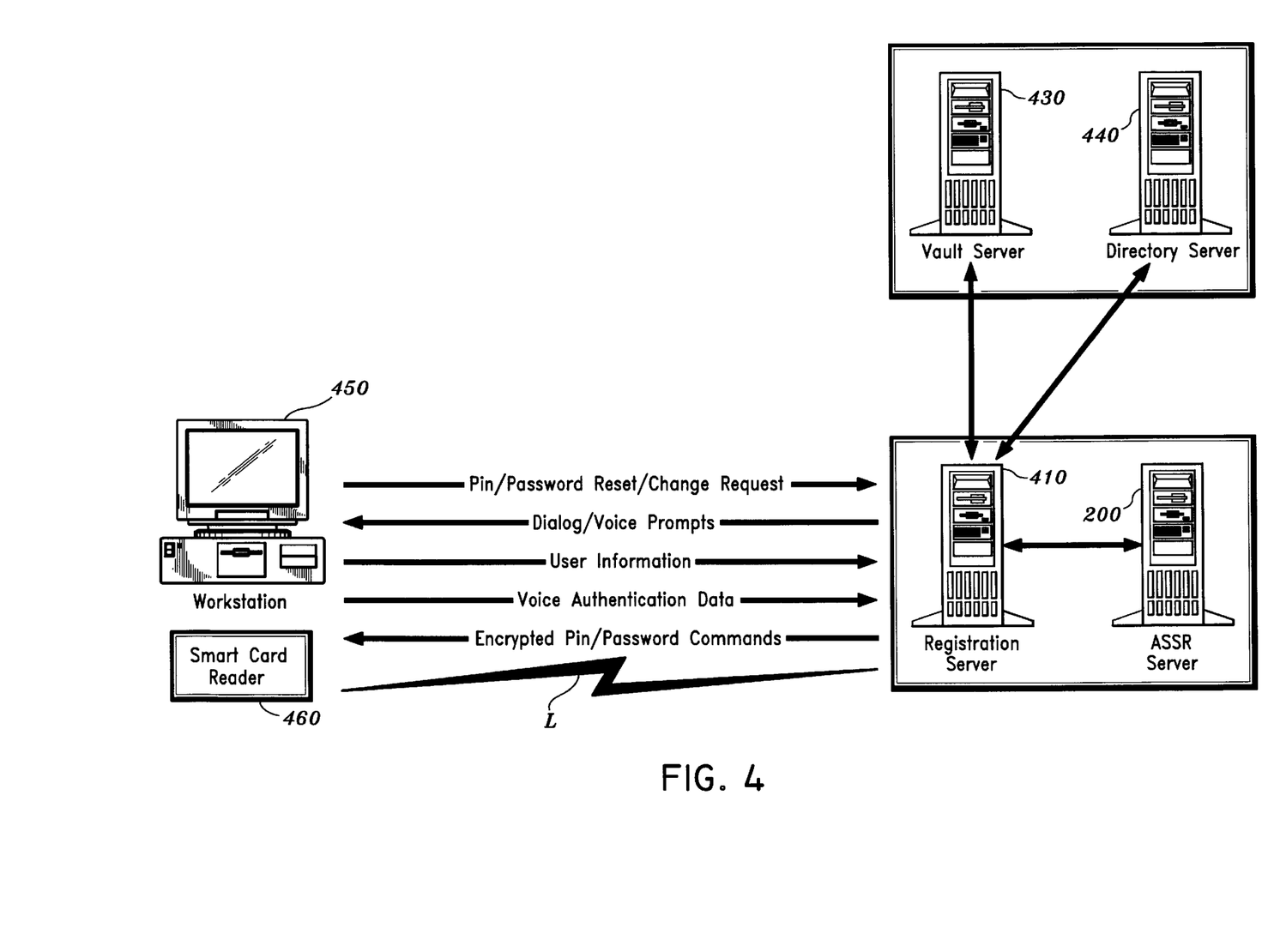
FIG. 4 illustrates the use of the system according to the illustrative embodiment of the present invention in a smartcard PIN certification/reset system.

An application of the system according to the illustrative embodiment of the present invention in a smartcard certification/PIN reset system is illustrated in FIG. 4.

Smartcard initialization:

In a typical smartcard system, a smartcard is activated for usage by first being initialized with an institutions's certificate and private/public key sets. At the registration server 410, a system administrator typically inserts a new smartcard with his administrator smartcard and enters his PIN number to authorize the registration of a new user. The administrator then activates the user smartcard initialization program, which typically stamps the smartcard with information for a certificate such as user's private and public key set, user's names, serial number, smartcard serial number, etc.

The registration server 410, which may be equivalent to workstation 220 of FIG. 3, creates the user profile, generates the request private/public key as well as the certificate, and downloads the information to the smartcard. Registration server 410 then requests the user to speak to the workstation speaker for identification purposes. These voice messages are sent to the ASSR server 200 (i.e., the ASSR server 200 discussed above with reference to FIGS. 1 to 3). The voice messages, the certificate and the unique smartcard serial number are stored in a database associated with or incorporated in ASSR server 200 for future authentication and other uses.

Alternatively, once the certificate is issued and the customer profile is built, registration server 410 uploads the enrollment data to vault server 430 and directory server 440 for storage. The enrollment data may also be downloaded to workstation 450 and smartcard reader 460. The workstation 450 includes the components and functions of the portable SSP 99 or a portable SSP may be coupled to workstation 450 to facilitate communication of speaker/speech information with the ASSR server 200. For each institution there is an key pair generated for each smartcard. The private key is burnt into the card for later PIN reset use. The smartcard is initialized with a unique serial number both internally (burnt in) and externally (printed on the card) for future use.

With the above-described installation or initialization, if the user forgets his PIN or his PIN has expired without resetting, he can remotely reset or reestablish his PIN by linking to the ASSR server 200 via communication link L to request for a PIN reset through his PC 450 or a hand-held portable SSP device 99 and smartcard reader 460 (or magnetic writer if a magnetic-band card is used in lieu of the smartcard) as follows:

With his PC 450, user establishes connection with the ASSR server 200 via communication link L (through, e.g., SSL V2) to request his smartcard PIN change. Dialogue boxes or voice prompts are presented to the user to enter his user ID, name, smartcard serial number, etc (i.e., user information). ASSR server 200 accesses the stored certificate and the user profile based on the entered information. ASSR server 200 then prompts the user to speak to the PC speaker with preset voice messages for authentication.

The accessed user profile and voice segments from the database is compared with the input messages from the user for authentication. The user may be given a few chances to make correct inputs to the verification program. If the verification is correct and the user is a current valid user, the ASSR server 200 uses the smartcard certificates and public key to encrypt the PIN reset command and sends it to the user PC and the associated smartcard reader. The user smartcard then uses its unique private key to decrypt the RESET PIN command.

If the smartcard private key successfully encrypts the RESET PIN command, the smartcard is then activated. The smartcard may include circuitry to compare the unique burnt-in serial number in the smartcard to the number provided by the ASSR server 200. If they are the same the smartcard will unlock itself for a PIN RESET operation.

Once the smartcard is activated and the PIN is reset, user can enter a new PIN to his smartcard. The smartcard will be available for any secure transaction purposes.

PIN RESET By Phone:

If a PC speaker is not available, user still can call an ASSR server 200 by phone to conduct smartcard PIN reset. Using the same speaker authentication procedure, he can instruct the server to construct the PIN RESET command encrypted in an electronic envelope for later use.

With his PC and smartcard reader, user establishes a secure socket layer (SSL) session (with only host certificate) with the smartcard administration server through ASSR server 200, and requests for a PIN reset. The ASSR server 200 then sends the encrypted envelope to the PC smartcard reader. When the smartcard receives the electronic envelope, the smartcard's private key is used to decrypt the command inside the envelope. Only the smartcard with the right private key can decrypt the PIN RESET command. The smartcard also compare the unique smartcard serial number with the one provided by the smartcard administration server. Upon data match, the smartcard is reset for later PIN INIT and SET.

Remote Smartcard Deactivation:

If the smartcard is lost or stolen, user has to deactivate his smartcard as soon as possible. In this case, he can connect to the smartcard administration server through ASSR server 200 by phone to have his smartcard deactivated with the same authentication procedure.

The above illustrative application of the system according to illustrative embodiments of the present invention can be used for voice verified network access logon or password.

A network user performs an initialization process to record a set of preset speaker messages for recordation in the ASSR server database. The ASSR server 200 may serve as the administration server to perform all logon ID and password administration tasks using the speaker authentication process as described for the smartcard user authentication.

Similar to the smartcard PIN reset process, if a user forgets his logon password or his password was expired, he requests a change or reactivation by authenticating through the ASSR server 200 and new passwords or reactivation may be downloaded to the user. Other applications include interaction with an electronic money card or wallet card, wherein an IC chip contains information about the amount of money remaining in the card. The amount of money is reduced when the card is used to purchase an item. The system according to the illustrative embodiment of the present invention can be used to refill the money card using the procedure similar to the smartcard reactivation process described above.

Although certain embodiments of the present invention have been described in detail, one of ordinary skill will realize numerous variations and modifications are possible without departing from the spirit of the present invention. Accordingly, reference should be made to the appended claims to ascertain the scope of the present invention.

What is claimed is:

1. A portable acoustic signal preprocessing device for accessing an automatic speech/speaker recognition (ASSR) server, comprising:
 a microphone for converting sound including speech, silence and background noise signals to analog signals;
 an analog signals to digital converter for converting said analog signals to digital signals;
 a digital signal processor (DSP) for generating from said digital signals feature vector data representing said digitized speech, and for generating characterization signals for processing by said ASSR server to estimate a channel signature of a communication channel linking said portable device and said ASSR server;
 an acoustic coupler for converting said feature vector data and said characterization signals to acoustic signals and for coupling to an acoustic communication device for communicating said acoustic signals over said communication channel to said ASSR server for performing speech and speaker recognition at a remote location.

2. The device according to claim 1, further including an encryption device for encrypting said feature vector data.

3. The device according to claim 1, further including a data compression device for compressing said feature vector data.

4. The device according to claim 1, wherein said acoustic coupler includes means for receiving return signals from said remote location over said communication channel and for converting said return signals to digital return data for processing by said DSP.

5. The device according to claim 4, wherein said DSP further includes means for decompressing said digital return data.

6. The device according to claim 4, wherein said DSP further includes means for decrypting said digital return data.

7. The device according to claim 1, wherein said DSP includes means for receiving and processing data from a server connected to said channel at said remote location.

8. The device according to claim 1, wherein said DSP includes memory for storing data including key data unique to said device.

9. The device according to claim 1, further including means for characterizing communication channel characteristics associated with silence and background noise surrounding said device.

10. A client/server system, comprising:
 a portable speech signal preprocessor (SSP) having:
  a digital signal processor (DSP) for processing digitized speech spoken into said SSP, for generating feature vector data representing said speech, and for generating channel characterization signals; and
  a coupler for coupling to a communication device for communicating signals representing said feature vector data and said characterization signals over a communication channel; and
 an automatic speech/speaker recognition (ASSR) server remotely connected to said communication channel for receiving said signals representing said feature vector data and said characterization signals transmitted from said portable SSP via said communication channel, wherein said ASSR server processes said characterization signals to estimate a channel signature of said communication channel and recognizes said speaker and speech by decoding said feature vector data signals, said channel signature being used by said ASSR server during recognition to increase the decodings accuracy for said speaker and speech recognition.

11. The system according to claim 10, wherein said ASSR server includes stored models of authentication data for authenticating valid subscribers by processing said signals received from said portable SSP and comparing processed signals with said stored models of authentication data.

12. The system according to claim 10, wherein said ASSR server includes a database of vocabulary for speech recognition by processing said signals received from said portable SSP and comparing processed signals with said database.

13. The system according to claim 10, wherein said ASSR server authenticates user passwords by processing said signals received from said portable SSP.

14. The system according to claim 10, wherein said ASSR server identifies a caller by processing signals received from said portable SSP, said signals originating from speech spoken into said portable SSP by said caller.

15. The system according to claim 10, wherein said portable SSP includes means for receiving and processing return signals from said ASSR server.

16. The system according to claim 15, wherein said return signals include one of a changed authentication data and a prompt.

17. The system according to claim 10, wherein said portable SSP includes associated memory for storing data including data received from said ASSR server.

18. The system according to claim 10, wherein said coupler is an acoustic coupler for converting said feature vector data into acoustic signals and said communication channel is an acoustic communication channel.

19. The system of claim 10, wherein said SSP further comprises means for generating acoustic data representing silence and background noise, and wherein said ASSR server includes means for processing said acoustic data, whereby said processed acoustic data is used by said ASSR server to perform speech recognition of said feature data signals.

20. A method for authenticating a valid client of a client/server system by voice, comprising the steps of:

storing a plurality of models of enrollment data in a memory of an automatic speech/speaker recognition (ASSR) server;

connecting to said ASSR server over a communication channel from a portable speech signal preprocessing (SSP) device disposed remotely from said ASSR server;

speaking said enrollment data into said portable SSP device;

preprocessing said enrollment data in said portable SSP device into feature vector data;

compressing said feature vector data and transmitting said compressed feature vector data by said SSP device over said communication channel;

receiving and decompressing said compressed feature vector data by said ASSR server;

processing said decompressed feature vector data by said ASSR server to perform speech and speaker recognition by comparing the processed decompressed feature vector data with said stored models for authenticating said valid client; and changing a user password by transmitting changed password data to said portable SSP device from said ASSR server.

21. The method according to claim 20, further including the step of changing a smartcard PIN (personal identification number) by forwarding changed smartcard data to said portable SSP device from said ASSR server.

22. The method according to claim 21, wherein said changed smartcard data is encrypted by said ASSR server and said portable SSP device decrypts said changed smartcard data for changing said smartcard PIN.

23. The method according to claim 20, further including the step of changing a PIN (personal identification number) of a magnetic card by forwarding changed PIN data to a magnetic card writer and said portable SSP device from said ASSR server.

* * * * *